March 1, 1949. W. KOEPKE 2,463,184
TRASH PICKER
Filed May 3, 1945 2 Sheets-Sheet 1
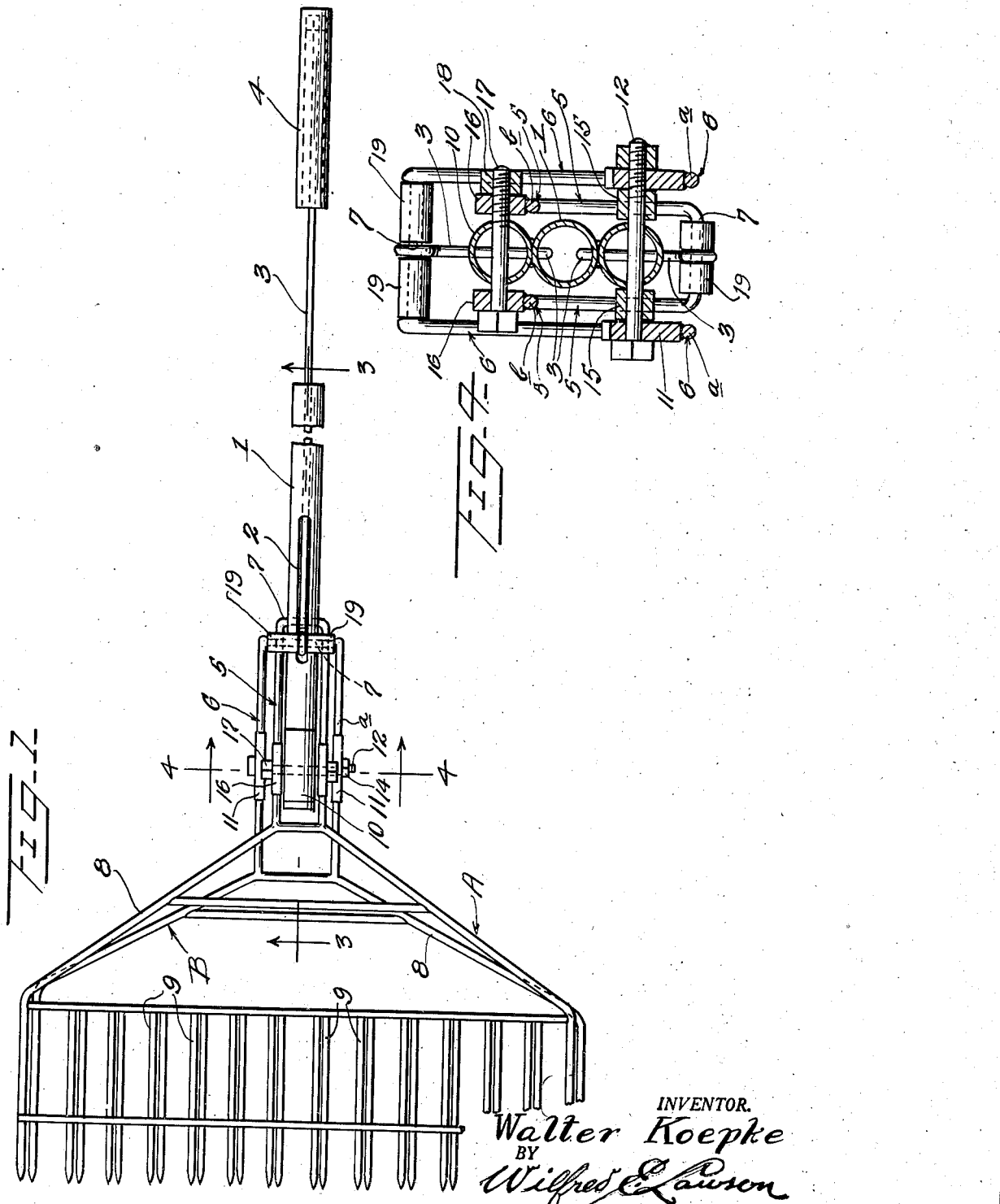
INVENTOR.
Walter Koepke
BY
Wilfred E. Lawson
Attorney

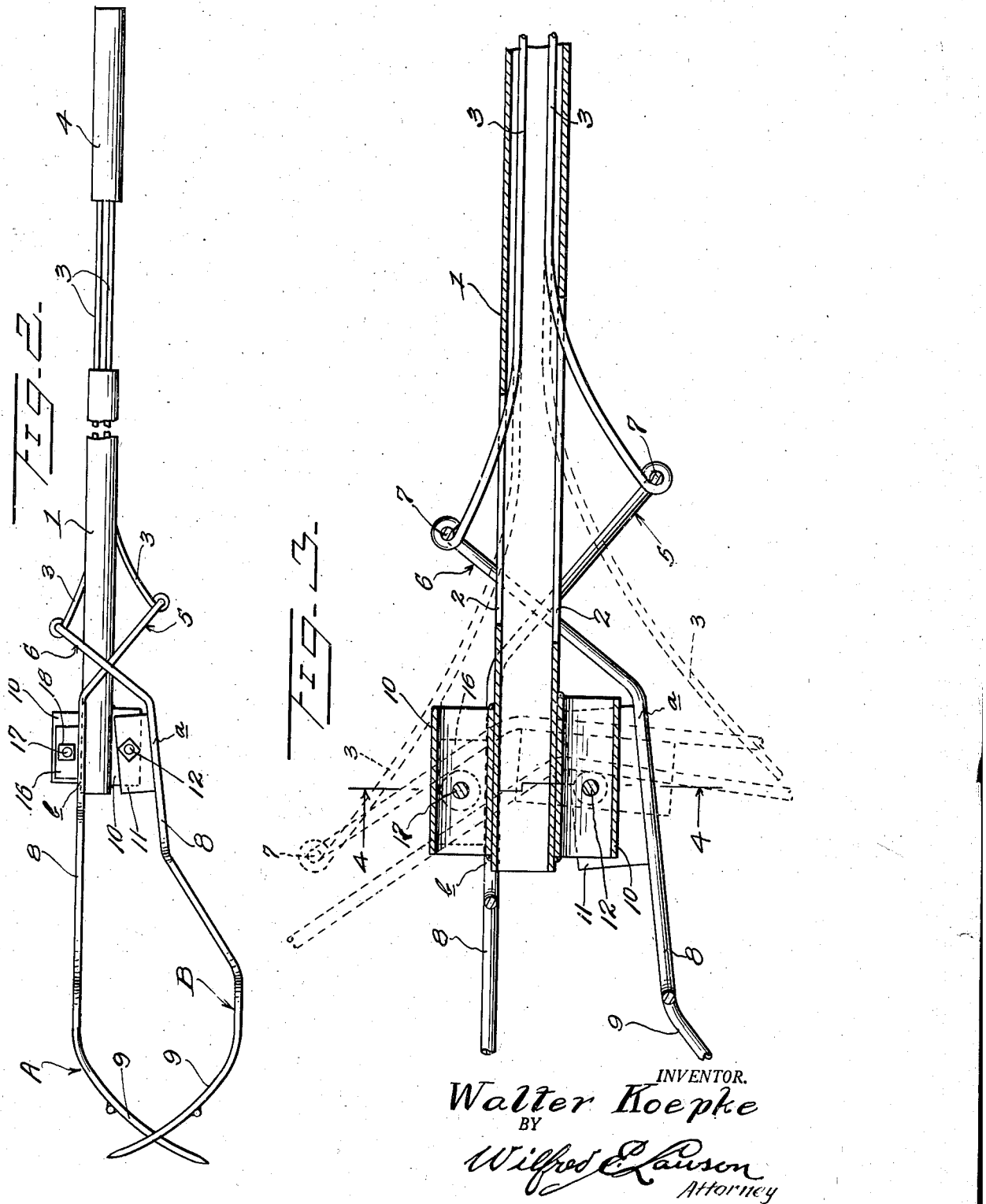

Patented Mar. 1, 1949

2,463,184

UNITED STATES PATENT OFFICE 2,463,184

TRASH PICKER

Walter Koepke, Baytown, Tex.

Application May 3, 1945, Serial No. 591,654

5 Claims. (Cl. 294—115)

This invention relates to a trash picker and it is an object of the invention to provide an impliment of this kind which can be employed for immediately picking up trash and wherein the construction is such as to render the same particularly advantageous for domestic use.

It is also an object of the invention to provide an implement of this kind which can be conveniently employed as a tong for picking up oysters out of the water and for other kindred uses.

The invention consists in the details of construction and in the combination and arrangement of the several parts of my improved trash picker whereby certain important advantages are attained, as will be hereinafter more fully set forth.

In order that my invention may be the better understood, I will now proceed to describe the same with reference to the accompanying drawings, wherein:

Figure 1 is a view in top plan of an implement constructed in accordance with an embodiment of the invention.

Figure 2 is a view in side elevation of the implement as illustrated in Figure 1;

Figure 3 is an enlarged detail sectional view taken substantially on the line 3—3 of Figure 1; and Figure 4 is an enlarged detail sectional view taken substantially on the line 4—4 of Figure 1.

In the embodiment of the invention as illustrated in the accompanying drawings, 1 denotes an elongated tubular handle member of desired dimensions and which is provided in its forward portion with the substantially diametrically opposed slots 2 directed lengthwise of the handle member 1.

Extending into the tubular handle member 1 through the rear end thereof are the elongated flexible rods 3. The inner portions of these rods 3 freely pass out through the slots 2 of the handle member 1. The outer extremities of the rods 3 are rigidly secured to the inner portion of an elongated hand grasp 4 whereby the desired endwise movement may be imparted to the flexible rods 3 which possess sufficient rigidity to effect the desired opening or closing of the jaw members A and B.

The jaw members A and B include respectively the elongated rectangular skeleton arms 5 and 6 which are inwardly and rearwardly disposed on a desired angle, with said arms 5 and 6 in crossed relation. The forward portion of the handle member 1 is freely disposed through these arms 5 and 6 and one of the arms, as 5, is also freely disposed through the arm 6.

As is clearly illustrated in Figure 1 of the drawings, the arm 5 is of a width less than that of the arm 6 and also of a less length. The arms 5 and 6, however, are of such lengths to permit the desired swinging or rocking movement of the jaw members A and B without interference being offered by the handle member 1 which is directed through said arms 5 and 6. The arms 5 and 6, as is clearly illustrated in the accompanying drawings, are each provided at its outer or free end with a cross-bar 7 with which is operatively engaged the inner end portion of a rod 3.

Each of the jaw members A and B, as herein disclosed, comprises a skeleton head 8 substantially V-shaped in form with its apex inwardly disposed and with the arm 5 or 6 at said apex portion of the head. The outer or wider portion of the head 8 of each of the jaw members A and B is provided at spaced points therealong with the outwardly directed tines 9 of desired form and so designed as to allow the tines of both of the jaw members A and B to effectively pick up trash or the like as the jaw members A and B are closed one with respect to the other and to retain such material therebetween.

In the present embodiment of the invention, the forward end portion of the handle member 1 has rigidly secured thereto the diametrically opposed elongated lug members 10, herein disclosed as cylindrical in form, and which have their axes extended lengthwise of the handle member 1. These lug members 10 are in advance of the slots 2 and, in the present embodiment of the invention, the head 8 of the jaw member B is outwardly of one of these lug members 10 and the inner portions a of the side members of the arm 6 are provided therealong with inwardly disposed plates 11 which overlie the opposite side faces of the adjacent or coacting lug member 10 at opposite sides thereof and with the central portions of these plates 11 pivotally held to said lug member 10 by a pivot member 12 herein disclosed as a conventional type of headed bolt and a coacting retaining nut 14. As is clearly illustrated in Figure 4 of the drawings, there is interposed between the plates 11 and the adjacent lug member 10 the spacing blocks 15 herein disclosed as bushings surrounding the pivot member 12.

The forward portions b of the side members of the arm 5 of the jaw member A are provided with the outwardly disposed plates 16 extending lengthwise of said side members and which overlie the opposite sides of the second lug member 10. The central portions of these plates 16 are pivotally held to the second lug member 10 by the pintle member 17, also herein disclosed as a headed bolt, and a coacting holding nut 18.

It is to be pointed out that the plates 11 and 16, together with the lug members 10, provide a simple yet effective means whereby the jaw members A and B may be maintained in assembly to effect the desired movement of said jaw members one toward the other upon requisite endwise movement being imposed upon the rods 3. Upon pull upon the rods 3, the jaw members A and B will be moved one toward the other to pick up and hold trash or the like while push upon said rods 3 will effect the desired opening movement of the jaw members A and B.

The rods 3 are maintained in desired position upon the cross-bar 7 by the conventional spacer sleeves 19, as is clearly illustrated in the drawings.

While the form of the jaw members A and B as illustrated in the drawings has proven of particular advantage, yet it is not desired that the invention be limited in this respect.

From the foregoing description it is thought to be obvious that a trash picker constructed in accordance with my invention is particularly well adapted for use by reason of the convenience and facility with which it may be assembled and operated.

I claim:

1. An implement of the class described comprising an elongated handle member, jaw members having rearwardly directed arms in the form of rectangular frames, the rearward extremities of said arms being inwardly and rearwardly inclined with one arm extending through the other, means pivotally connecting said arms forwardly of the inclined extremities to the handle member for oscillation on separate spaced parallel axes lying at opposite sides of the handle, and means carried by the handle member and operatively engaged with the arms for swinging the jaw members one with respect to the other.

2. An implement as set forth in claim 1 wherein the means for pivotally mounting the jaw members to the handle member includes lug members carried by the handle member and substantially diametrically opposed, plates carried by the side members of the arms of the jaw members overlying the said lug members, and means for pivotally connecting said plates to the lug members.

3. An implement as set forth in claim 1 wherein the handle member is tubular and provided with substantially diametrically opposed slots directed lengthwise thereof and wherein the means for moving the jaw members one with respect to the other comprises resilient rods extending within the handle member, with end portions extending out through the slots, and means for operatively connecting said extended portions to the arms of the jaw members.

4. An implement of the character described, comprising a relatively long handle bar, a pair of jaw members, a pair of pivots carried by the bar at one end, the pivots being transversely of the bar and disposed upon opposite sides thereof, each jaw being mounted for swinging on one pivot, an arm carried by each jaw and extending obliquely across the handle bar behind the pivots and in crossed relation with the other arm, and a pair of relatively long flexible members supported by and extending longitudinally of the handle for movement longitudinally thereof and each curving outwardly therefrom at the said one end of the handle and having pivotal connection with the outer end of an arm.

5. A hand implement of the character described, comprising a relatively long tubular handle bar having opposite slots adjacent to one end, a pair of jaw members, a pair of pivot elements supported transversely of the handle adjacent to and between the said one end and the slot, said pivot elements being disposed at opposite sides of the handle, each jaw being supported upon a pivot element for oscillation on an axis extending transversely of the handle bar, an arm carried by each jaw and extending obliquely rearwardly across the handle bar between the pivot elements and the slot, said arms being in crossed relation, a pair of flexible rods extending longitudinally through the handle bar and each having a curved end extending through a slot, the curved end of each rod being pivotally coupled with an end of an arm, and means connected with the rods for facilitating longitudinal movement of the rods in the handle bar.

WALTER KOEPKE.

REFERENCES CITED

The following references are of record in the file of this patent:

UNITED STATES PATENTS

| Number | Name | Date |
|---|---|---|
| 296,550 | Foster | Apr. 8, 1884 |
| 786,663 | McCoy | Apr. 4, 1905 |
| 961,761 | Erickson | June 21, 1910 |
| 2,230,498 | Loos et al. | Feb. 4, 1941 |